United States Patent
Sunahara et al.

(10) Patent No.: US 6,334,992 B1
(45) Date of Patent: Jan. 1, 2002

(54) PROCESS FOR PRODUCING A POSITIVE ELECTRODE ACTIVE MATERIAL FOR A LITHIUM SECONDARY CELL

(75) Inventors: Kazuo Sunahara; Takashi Kimura, both of Chigasaki (JP)

(73) Assignee: Seimi Chemical Co., Ltd., Chigasaki (JP)

( * ) Notice: Subject to any disclaimer, the term of this patent is extended or adjusted under 35 U.S.C. 154(b) by 0 days.

(21) Appl. No.: 09/606,183

(22) Filed: Jun. 29, 2000

(30) Foreign Application Priority Data

Jun. 30, 1999 (JP) ............................................. 11-186456

(51) Int. Cl.⁷ ........................ C01G 51/00; C01G 53/00; C01D 15/00
(52) U.S. Cl. ..................................... 423/594; 252/519.1
(58) Field of Search ...................... 423/594; 252/519.1; 429/223

(56) References Cited

U.S. PATENT DOCUMENTS 6,241,959 B1 * 6/2001 Cho et al.

FOREIGN PATENT DOCUMENTS

JP 10-321229 * 12/1998

* cited by examiner

*Primary Examiner*—Steven Bos
(74) *Attorney, Agent, or Firm*—Oblon, Spivak, McClelland, Maier & Neustadt, P.C.

(57) ABSTRACT

A process for producing a positive electrode active material for a lithium secondary cell comprising a lithium-containing complex oxide of the formula $Li_xCo_yNi_{1-y}O_2$ wherein $0.95 \leq x \leq 1.05$, and $0.05 \leq y \leq 0.50$, which comprises heating an aqueous solution containing an ammine cobalt salt and an ammine nickel salt to form a salt containing cobalt and nickel, then mixing the salt with a lithium compound and firing the obtained mixture at a temperature of from 600 to 850°C.

6 Claims, No Drawings

PROCESS FOR PRODUCING A POSITIVE ELECTRODE ACTIVE MATERIAL FOR A LITHIUM SECONDARY CELL

BACKGROUND OF THE INVENTION

1. Field of the Invention

The present invention relates to a novel process for producing a positive electrode active material for a lithium secondary cell.

2. Discussion of Background

Many of positive electrode active materials used in lithium secondary cells which are practically employed at present, are made of lithium cobalt oxide. However, lithium secondary cells are required to have a larger cell capacity, and lithium nickel oxide has been studied as a new positive electrode active material.

However, lithium nickel oxide undergoes crystal expansion or shrinkage upon absorption or desorption of lithium. Especially when at least 80% of lithium is desorbed, irreversible shrinkage of crystal takes place, and it is known that the cell capacity decreases substantially by repetition of absorption and desorption of lithium i.e. repetition of charging and discharging (T. Ohzuku, et.al., J. Electrochem. Soc., 140, 1862, (1993)).

Further, when lithium nickel oxide is used as a positive electrode active material, a phenomenon of abrupt heat generation due to oxidation of an electrolyte in a cell by highly oxidized nickel oxide, is observed during charging. This is a serious problem against practical use of lithium nickel oxide. To solve this problem, it has been proposed to replace a part of nickel with aluminum (T. Ohzuku, et. al., J. Electrochem. Soc., 142, 4033, (1995)). However, with the composition shown by this study, the cell capacity per unit mass is not substantially different from one where lithium cobalt oxide is used, and the merit for high cell capacity by the use of lithium nickel oxide tends to be small.

As a method for solving such problems, JP-B-2770154 and JP-A-8-222220 disclose a case wherein an improvement has been attempted by replacing a part of nickel with cobalt.

Such a positive electrode active material of the formula $Li_pCo_qNi_{1-q}O_2$ wherein $0.95<p<1.05$, and $0.15<q<0.25$, having a part of nickel substituted with cobalt, is capable of solving the problems such as cycle deterioration and heat generation when the conventional lithium nickel oxide is used as a positive electrode active material, while maintaining a high cell capacity which is a characteristic of lithium nickel oxide. However, in its production, no adequate high cell capacity has been obtained by a method wherein a lithium salt, a cobalt salt and a nickel salt are simply mixed and fired, and a method of using a coprecipitated salt of cobalt and nickel has been attempted. A synthetic method for such a coprecipitated salt may, for example, be a method wherein cobalt chloride and nickel chloride are dissolved in pure water having carbon dioxide gas saturated therein, and sodium bicarbonate is added thereto for coprecipitation to obtain a basic carbonate (JP-B-2770154) or a method wherein an alkali solution is added to an aqueous solution of cobalt sulfate and nickel sulfate to obtain a coprecipitated hydroxide (JP-A-8-222220). In either case, an alkali metal such as sodium remains in the precipitates, and such an alkali metal remains in the positive electrode active material, whereby it has been impossible to minimize deterioration by repetition of charging and discharging. Further, in a case where a basic carbonate coprecipitated with sodium bicarbonate, is used, there has been a drawback that the heat generation initiation temperature during charging is low.

SUMMARY OF THE INVENTION

It is an object of the present invention to provide a process for producing a lithium-containing complex oxide containing nickel and cobalt together with lithium, whereby the cycle deterioration and heat generation behavior during charging can be overcome while maintaining a high cell capacity.

That is, the present invention provides a process for producing a positive electrode active material for a lithium secondary cell comprising a lithium-containing complex oxide of the formula $Li_xCo_yNi_{1-y}O_2$ wherein $0.95 \leq x \leq 1.05$, and $0.05 \leq y \leq 0.50$, which comprises heating an aqueous solution containing an ammine cobalt salt and an ammine nickel salt to form a salt containing cobalt and nickel, then mixing the salt with a lithium compound and firing the obtained mixture at a temperature of from 600 to 850° C.

DETAILED DESCRIPTION OF THE PREFERRED EMBODIMENTS

In the present invention, x in the formula for the lithium-containing complex oxide is from 0.95 to 1.05, preferably from 0.95 to 1.00. Further, y is from 0.05 to 0.50, preferably from 0.1 to 0.3, particularly preferably from 0.15 to 0.25, from the cell capacity and the high temperature safety when the positive electrode active material is used for a lithium secondary cell.

The lithium-containing complex oxide obtained by the process of the present invention is excellent in the high cell capacity and the heat generation behavior during charging. Further, a salt containing cobalt and nickel (hereinafter referred to also as a cobalt nickel salt) is formed without adding an alkali metal compound to an aqueous solution of a mixture of a cobalt salt and a nickel salt, whereby cobalt and nickel are uniformly distributed with little impurities of alkali metals such as sodium.

A lithium compound is added to the cobalt nickel salt thereby obtained, followed by firing, whereby it is possible to obtain a lithium cobalt nickel oxide having cobalt and nickel uniformly solid-solubirized, with little impurities of alkali metals. An alkali metal such as sodium is believed to enter into lithium sites in the lithium cobalt nickel oxide to form a defect in the crystal and thereby to hinder transfer of lithium, which in turn causes deterioration of the charging and discharging capacity. Accordingly, it is extremely useful to obtain a positive electrode active material of such a lithium-containing complex oxide with little impurities.

The valences of cobalt and nickel in the ammine cobalt salt and the ammine nickel salt to be used in the present invention, are riot particularly limited. However, it is preferred that cobalt is bivalent or a mixture of bivalent and trivalent, and nickel is bivalent. The ammine cobalt salt and the ammine nickel salt to be used in the present invention, are preferably carbonates, sulfates or nitrates. It is particularly preferred that either, particularly each, of them is a carbonate, since the solubility in water is high, and it is easy to form a complex salt of cobalt and nickel having high uniformity by heating. By heating an aqueous solution containing an ammine cobalt carbonate and ammine nickel carbonate, it is possible to obtain a salt (a basic carbonate) of cobalt and nickel.

The temperature for heating the aqueous solution containing an ammine cobalt salt and an ammine nickel salt is preferably from 100 to 150° C., particularly preferably from 120 to 140° C., since the thermal decomposition of an ammine cobalt salt and an ammine nickel salt usually takes place at a temperature of at least 100° C., although it depends also on the types of the salts.

Further, during the reaction, ammonia gas or the like will be generated. For example, in the case of a carbonate, carbon dioxide gas and ammonia gas will be generated. The pressure in the reaction system at that time is preferably within a range of from atmospheric pressure to 0.5 Mpa.

Thus, a salt is formed by permitting thermal decomposition to take place at a high temperature, whereby a salt is obtainable wherein cobalt and nickel are uniformly distributed. Consequently, in the obtained positive electrode active material, there will be no irregularity in the composition due to segregation of cobalt or nickel. Accordingly, it is believed that in a lithium secondary cell employing the positive electrode active material obtained by the present invention, the heat generation behavior during charging is improved.

Then, the salt obtained as described above, and a lithium compound are mixed, and this mixture is fired to obtain a desired lithium cobalt nickel oxide. The lithium compound to be used here, is not particularly limited, but a hydroxide, an oxide or a carbonate is preferred. Especially, lithium hydroxide is preferred from the viewpoint of the charging and discharging cycle durability and the cell capacity of a lithium secondary cell employing the positive electrode active material thereby obtained.

The firing temperature of the above mixture is from 600 to 850° C., preferably from 700 to 800° C. If it is lower than 600° C., the reaction tends to be inadequate, whereby presence of nickel oxide or the like tends to be observed by the X-ray diffraction measurement. If it exceeds 850° C., nickel tends to be included in lithium sites, whereby capacity decrease is likely to result, and further, if it becomes at least 900° C., lithium tends to be remarkably evaporated, whereby the capacity tends to remarkably decrease. The firing is preferably carried out in two steps as described below, whereby the resulting lithium cobalt nickel oxide will be more homogenized, whereby the heat generation behavior during charging will be improved.

Namely, the mixture of the lithium compound and the salt containing cobalt and nickel, is heated at a temperature of from 300 to 600° C., preferably from 450 to 550° C., then mixed again, for example, by means of e.g. a mortar or blender, so that the obtained powder is homogenized, and further fired at a temperature of from 600 to 850° C., preferably from 700 to 800° C. By the firing at a temperature of from 300 to 600° C., decomposition of the cobalt nickel salt and the lithium compound is permitted to take place slowly, followed by mixing again, whereby lithium, cobalt and nickel are homogenized in the mixture, whereby the obtained lithium cobalt nickel oxide will be homogenized, and the heat generation behavior during charging will thereby be improved. If the interior of the furnace is reducing by an inert atmosphere such as nitrogen or by a decomposition gas of an organic substance, during the second firing, nickel tends to be reduced to form a nickel (bivalent) oxide phase or nickel metal, and accordingly, it is preferred to maintain the internal atmosphere at an oxygen concentration of at least 25%.

A method for producing an active material for a lithium secondary cell by using a lithium-containing complex oxide obtained as described above, can be carried out by a known method.

Now, the present invention will be described in further detail with reference to Examples. However, it should be understood that the present invention is by no means restricted to such specific Examples, and various modifications are possible within the scope of the present invention.

EXAMPLE 1

Preparation of an Aqueous Ammine Nickel Carbonate Solution and an Aqueous Ammine Cobalt Carbonate Solution 0.2 mol of nickel sulfate was added to 1 l of water, followed by stirring to prepare an aqueous nickel sulfate solution. Then, 5 l of kerosene oil having 10% (mass%, the same applied hereinafter unless otherwise specified) of isotridecanol and 5% of 2-hydroxy-5-nonylacetophenone oxime dissolved, was added thereto, and the mixture was heated to 50° C. therein and then put into a separating funnel for extraction. The oil layer was washed twice with water, and then 1 l of an aqueous ammonia solution diluted to 20% and 400 g of ammonium carbonate were gradually added with vigorous stirring. The aqueous layer was separated to obtain an aqueous ammine nickel carbonate solution.

0.2 mol of cobalt sulfate was added to 1 l of water, followed by stirring to prepare an aqueous cobalt sulfate solution. Then, 1000 g of a 10% ammonia aqueous solution and 5 l of kerosene oil having 10% of isotridecanol and 5% of bis(2-ethylhexyl)phosphoric acid dissolved therein, were added thereto, and the mixture was put into a separating funnel and vigorously stirred. The aqueous layer was discarded, and the oil layer was washed twice with water, and then an aqueous cobalt sulfate solution was added for extraction. The oil layer was washed three times with water, and then 1 l of an aqueous ammonia solution diluted to 20% and 400 g of ammonium carbonate were gradually added with vigorous stirring. The aqueous layer was separated to obtain an aqueous ammine cobalt carbonate solution.

Preparation of a Cobalt Nickel Salt (Basic Carbonate)

The aqueous ammine cobalt carbonate solution containing 0.2 mol of cobalt and the aqueous ammine nickel carbonate solution containing 0.8 mol of nickel, obtained as described above, were mixed, and the mixture was slowly stirred in an autoclave while maintaining the pressure at 3 atm and gradually blowing a high pressure steam of 5 atm, and reacted at 135° C. for one hour. After cooling, the precipitate was collected by filtration, washed with pure water, and then dried in air to obtain a cobalt nickel salt (a basic carbonate). The cobalt nickel salt thus obtained was found to contain cobalt and nickel in a ratio of 2:83, as a result of the elemental analysis. Sodium was quantitatively analyzed by an atomic absorption method and found to be less than 10 ppm. Further, the yield can be quantitatively obtained by ionic conversion.

In this Example, sulfates were used as synthetic materials for ammine complexes of cobalt and nickel, but chlorides may be employed instead thereof. Further, an aqueous ammine cobalt carbonate solution and an aqueous ammine nickel carbonate solution are obtainable in high purity in the same manner as shown in this Example, by a process for extraction and purification from the respective ores, and it is most preferred to use them as they are.

Preparation of a Positive Electrode Active Material

The cobalt nickel salt obtained as described above and lithium hydroxide were mixed in a molar ratio of Li:Co:Ni:=1:0.2:0.8 and subjected to heat treatment at 500° C. for 24 hours. This mixture was mixed again in a mortar and then fired at 750° C. for 6 hours while maintaining the oxygen concentration at a level of at least 25%. The product was pulverized in a mortar and sieved by a screen with openings of 75 μm to obtain a positive electrode active material.

EXAMPLE 2

The preparation was carried out in the same manner as in the preparation of a cobalt nickel salt in Example 1except that an aqueous ammine cobalt carbonate solution containing 0.15 mol of cobalt and an aqueous ammine nickel carbonate solution containing 0.85 mol of nickel, were mixed. A positive electrode active material was obtained in the same manner as in Example 1 except that this cobalt nickel salt and lithium hydroxide were mixed in a molar ratio of Li:Co:Ni:=1:0.15:0.85.

EXAMPLE 3

The preparation was carried out in the same manner as in the preparation of a cobalt nickel salt in Example 1 except that an aqueous ammine cobalt carbonate solution containing 0.18 mol of cobalt and an aqueous ammine nickel carbonate solution containing 0.82 mol of nickel were mixed. A positive electrode active material was prepared in the same manner as in Example 1 except that this cobalt nickel salt and lithium hydroxide were mixed in a molar ratio of Li:Co:Ni:=1:0.18:0.82.

EXAMPLE 4

The preparation was carried out in the same manner as in the preparation of a cobalt nickel salt in Example 1 except that an aqueous ammine cobalt carbonate solution containing 0.25 mol of cobalt and an aqueous ammine nickel carbonate solution containing 0.75 mol of nickel were mixed. A positive electrode active material was prepared in the same manner as in Example 1 except that this cobalt nickel salt and lithium hydroxide were mixed in a molar ratio of Li:Co:Ni:=1:0.25:0.75.

EXAMPLE 5

The cobalt nickel salt in Example 1 and lithium hydroxide were mixed in a molar ratio of Li:Co:Ni:=1:0.2:0.8 and subjected to heat treatment at 500° C. for 24 hours. This mixture was mixed in a mortar and then fired at 700° C. for 6 hours while maintaining the oxygen concentration at a level of at least 25%. The product was pulverized in a mortar and sieved by a screen with openings of 75 μm to obtain a positive electrode active material.

EXAMPLE 6

The cobalt nickel salt in Example 1 and lithium hydroxide were mixed in a molar ratio of Li:Co:Ni:=1:0.2:0.8, followed by firing at 750° C. for 6 hours while maintaining the oxygen concentration at a level of at least 25%. The product was pulverized in a mortar and sieved by a screen with openings of 75 μm to obtain a positive electrode active material.

COMPARATIVE EXAMPLE 1

Nickel sulfate as a commercially available reagent was added to water to obtain a saturated aqueous nickel sulfate solution, and a predetermined amount (so that Co:Ni:=2:8) of cobalt sulfate was added thereto. Further, water was added for adjustment to obtain a saturated aqueous solution containing nickel sulfate and cobalt sulfate. Then, while stirring, an aqueous sodium hydroxide solution was gradually added to this aqueous solution, whereby precipitation (coprecipitation) of hydroxides of Ni and Co, started simultaneously. The aqueous sodium hydroxide solution was sufficiently added to confirm termination of the precipitation, and then the precipitate was recovered by filtration and washed with water. Washing with water was repeated while measuring the pH, and after confirming that the remaining alkali was substantially nil, the precipitate was dried by hot air (by means of a hot air dryer set at 100° C.). The coprecipitated hydroxide thus obtained was found to contain cobalt and nickel in a ratio of 2:8 as a result of the elemental analysis. Sodium was quantitatively analyzed by an atomic absorption method and found to be 500 ppm. This cobalt nickel coprecipitated hydroxide and lithium hydroxide were mixed in a molar ratio of Li:Co:Ni:=1:0.2:0.8, and subjected to heat treatment at 500° C. for 24 hours. The mixture was mixed again in a mortar, and then firing was carried out in an oxygen stream at 750° C. for 6 hours. The product was pulverized in a mortar and sieved by a screen with openings of 75 μm to obtain a positive electrode active material.

COMPARATIVE EXAMPLE 2

Nickel chloride hexahydrate and cobalt chloride hexahydrate were dissolved in pure water saturated with carbon dioxide gas so that the molar ratio of nickel to cobalt became 8:2. An aqueous sodium bicarbonate solution was added to this solution, and the mixture was left to stand for coprecipitation. The precipitate was collected by filtration, washed with water and then dried in air. The coprecipitated carbonate thus obtained was found to contain cobalt and nickel in a ratio of 2:8 as a result of the elemental analysis. Sodium was quantitatively analyzed by an atomic absorption method, and found to be 2000 ppm. This cobalt nickel coprecipitated carbonate and lithium hydroxide were mixed in a molar ratio of Li:Co:Ni:=1:0.2:0.8, and the mixture were subjected to heat treatment at 500° C. for 24 hours. The mixture was mixed again in a mortar, followed by firing in an oxygen stream at 750° C. for 6 hours. The product was pulverized in a mortar and sieved by a screen with openings of 75 μm to obtain a positive electrode active material.

COMPARATIVE EXAMPLE 3

The cobalt nickel coprecipitated carbonate prepared by the method of comparative Example 2 and lithium hydroxide were mixed in a molar ratio of Li:Co:Ni:=1:0.2:0.8, and firing was carried out at 750° C. for 6 hours while maintaining the oxygen concentration at a level of at least 25%. The product was pulverized in a mortar and sieved by a screen with openings of 75 μm to obtain a positive electrode active material.

Using the respective positive electrode active materials obtained as described above, cells were prepared by the following method, and the charging and discharging capacities and the heat generation initiation temperatures of the charged positive electrodes were measured. The results are shown in Table 1.

Measurement of Charging and Discharging Capacities

Charging and discharging were carried out at a current corresponding to 0.1C at a voltage of from 4.3V to 2.5V, whereby the initial charging capacity (mAh/g), the initial discharging capacity (mAh/g) and the discharging capacity (mAh/g) after 20 cycles were measured.

Measurement of Heat Generation Temperature

A cell prepared in the same manner was charged to 4.3V at a current corresponding to 0.1C and then subjected to constant voltage charging at 4.3V. Then, the cell was disassembled in dry argon, and the positive electrode plate was cut into a disk with a diameter of 2 mm and sealed in a measurement cell of a differential scanning calorimeter together with an electrolyte. Then, it was taken out in atmosphere and subjected to DSC measurement, whereby the heat generation initiation temperature (° C.) of the charged positive electrode was measured. The temperature raising rate of DSC was 5° C./min.

TABLE 1

|  | Co/Co + Ni | Initial charging capacity | Initial discharging capacity | Discharging capacity after 20 cycles | Heat generation initiation temperature |
| --- | --- | --- | --- | --- | --- |
| Example 1 | 0.20 | 206 | 197 | 190 | 191 |
| Example 2 | 0.15 | 220 | 205 | 185 | 170 |
| Example 3 | 0.18 | 217 | 203 | 187 | 188 |
| Example 4 | 0.25 | 200 | 193 | 189 | 191 |
| Example 5 | 0.20 | 211 | 201 | 187 | 189 |
| Example 6 | 0.20 | 188 | 167 | 130 | 196 |
| Comparative Example 1 | 0.20 | 205 | 196 | 180 | 188 |
| Comparative Example 2 | 0.20 | 202 | 182 | 161 | 160 |
| Comparative Example 3 | 0.20 | 185 | 162 | 112 | 172 |

According to the present invention, it is possible to provide a positive electrode active material capable of providing a high performance secondary cell which has a high cell capacity and undergoes little cycle deterioration at a high energy density and which is excellent in a high temperature safety during charging.

The entire disclosure of Japanese Patent Application No. 11-186456 filed on Jun. 30, 1999 including specification, claims, drawings and summary are incorporated herein by reference in its entirety.

What is claimed is:

1. A process for producing a positive electrode active material for a lithium secondary cell comprising a lithium-containing complex oxide of the formula $Li_xCo_yNi_{1-y}O_2$ wherein $0.95 \leq x \leq 1.05$, and $0.05 \leq y \leq 0.50$, which comprises heating an aqueous solution containing an ammine cobalt salt and an ammine nickel salt to form a salt containing cobalt and nickel, then mixing the salt with a lithium compound and firing the obtained mixture at a temperature of from 600 to 850° C.

2. The process for producing a positive electrode active material for a lithium secondary cell according to claim 1, wherein each of the ammine cobalt salt and the ammine nickel salt is a carbonate.

3. The process for producing a positive electrode active material for a lithium secondary cell according to claim 1, wherein the aqueous solution containing an ammine cobalt salt and an ammine nickel salt is heated at a temperature of from 100 to 150° C.

4. The process for producing a positive electrode active material for a lithium secondary cell according to claim 3, wherein the aqueous solution is heated under a pressure within a range of from atmospheric pressure to 0.5 Mpa.

5. The process for producing a positive electrode active material for a lithium secondary cell according to claim 1, wherein the mixture is heated at a temperature of from 300 to 600° C., then mixed again and further fired at a temperature of from 600 to 850° C.

6. The process for producing a positive electrode active material for a lithium secondary cell according to claim 1, wherein the lithium compound is lithium hydroxide.

* * * * *